May 6, 1941.  B. J. SELHORST  2,240,720
DISTRIBUTOR BLADE FOR MANURE SPREADERS OR THE LIKE
Filed Jan. 12, 1940
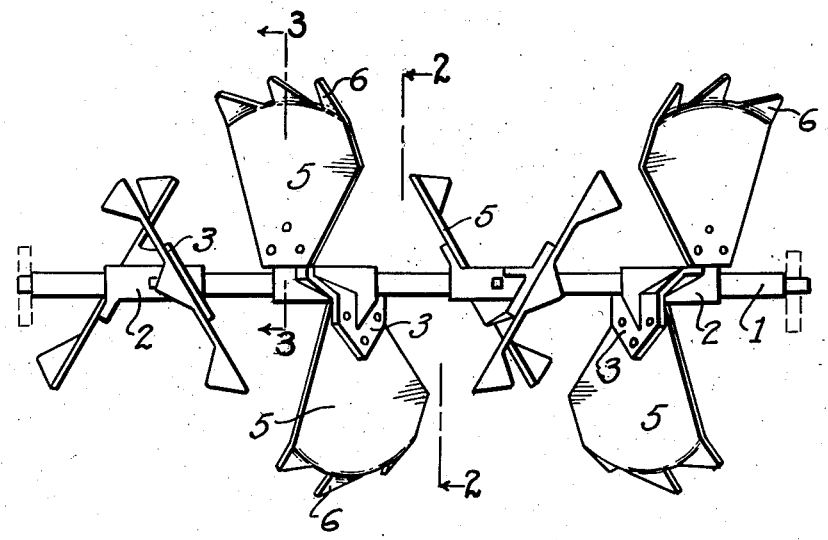
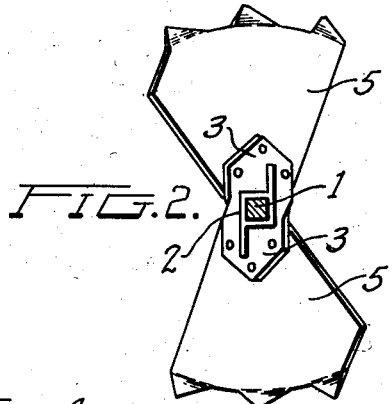
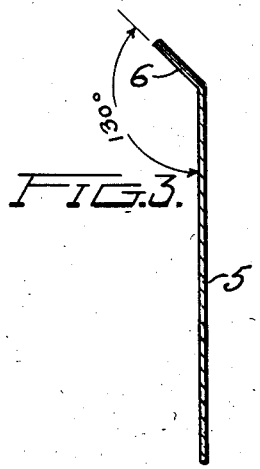
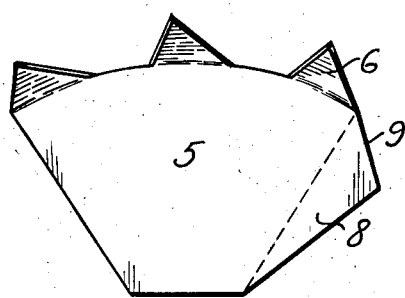
Inventor
Bernard J. Selhorst
By
Attorneys.

Patented May 6, 1941

2,240,720

UNITED STATES PATENT OFFICE 2,240,720

DISTRIBUTOR BLADE FOR MANURE SPREADERS OR THE LIKE

Bernard J. Selhorst, Coldwater, Ohio

Application January 12, 1940, Serial No. 313,583

3 Claims. (Cl. 275—6)

This invention relates to manure spreaders, and particularly to distributor blades used in connection therewith.

Machines of this character include beater means and distributor means, the purpose of the former being to disintegrate the material and deliver it rearward of the machine in a separated condition to the distributor means, and the purpose of the latter being to effect a more thorough separation and uniform spreading distribution of the material received from the beating means.

The condition of manure taken from barn stables and packed barn lots is generally very lumpy, particularly when the hauling out is done in the winter when the manure is in a more or less frozen state and removed to a considerable extent in solid lumps. When manure in this condition is handled, the beaters fail to perfectly perform their intended function and the manure is delivered in lumps against the blades of the distributor, and such blades that are in present-day use, so far as I am aware, fail to effect the desired breaking up and distribution of the lumps.

The primary object of the invention is the provision of a distributor means of the character described, the blades of which are of such construction as to effect a more thorough and efficient breaking up and disintegrating of the manure delivered to them than is possible with the distributing means heretofore used.

A further object of the invention is the provision of a distributor means of the class described which will effect a more thorough shredding and cutting up of the material than has heretofore been accomplished and will prevent the material building up on the forward edges of the distributor blades and thereby not only clogging but lessening the distributing efficiency of the machine.

A further object of the invention is the provision of a distributor means of the character described which effects a wider and more uniform distribution of the material than those heretofore used.

The invention is fully described in the following specification, and one embodiment thereof illustrated in the accompanying drawing, in which—

Figure 1 is an elevation of a distributor means embodying the invention looking rearwardly at the material receiving side thereof; Fig. 2 is a section on the line 2—2 in Fig. 1; Fig. 3 is an enlarged section of one of the blades taken on the line 3—3 in Fig. 1, and Fig. 4 is a front side view of one of the blades embodying the invention.

Referring to the drawing, 1 designates a distributor shaft adapted to be journaled at its ends in the sides of a spreader (not shown) at the rear of the customary beater means, as well understood in the art. Mounted on the shaft in axially spaced relation are a plurality of hub members 2, each having a pair of flanges 3 to each of which a distributor blade 5 is attached by riveting, or in any other suitable manner. These flanges and their blades are oblique to the plane of revolution thereof and disposed at opposite sides of the shaft and angularly disposed to each other, so that each of the blades, when at the top of the shaft, presents what may be termed a front face or side at an incline or deflecting angle to the direction of delivery of material thereto by the beater means, as is common and well understood in the art. The novel features of the invention reside in the blades themselves combined with their manner of mounting or disposition on the shaft.

Each blade 5 is flat and of substantially segmental form with its outer circumferential edge preferably concentric to the shaft axis and provided with a plurality of circumferentially spaced teeth 6 angularly disposed in the same direction to the front or material contacting side of the blade so that the inner tooth side presents an inclined material deflecting surface to the front side of the blade, as indicated. It is found in practice that to produce the best material distributing and lump breaking up results, the teeth should not only be spaced a substantial distance apart, as shown, but should be disposed at substantially an angle of 130° to the front face of the blade at the inner side of the tooth, as indicated in Fig. 3. It will be understood, however, that the invention is not limited to the disposition of the teeth at this particular angle, but that the primary purpose of the invention is to provide the teeth at an angle to the face of the blade so that they will have both a tendency to laterally deflect and also break up material which slides outwardly on the blade face by centrifugal action and contacts the teeth. Another advantage of the angled teeth is that they broaden the effective material contacting width or area of the blades axially of the shaft.

It is apparent that in use the material which is forcefully delivered rearwardly to the distributor by the beater means strikes the front faces of the upwardly extending rapidly revolving blades 5 with a glancing blow which tends to sidewise deflect the material. At the same time a centrifugal action of the blades causes the material to pass outwardly more or less radially of the shaft. In this latter action, the material moves outward into contact with the inner side faces of the teeth and is both broken up and laterally deflected thereby, and is also shredded and broken up by the cutting action of the teeth edges.

The teeth 6 are spaced sufficiently, as shown, to permit a considerable portion of the material to pass therebetween without substantial deflection and into the path of movement of the forward cutting edges of the teeth, while the remaining portion of the material on its outward or radial deflecting movement on the blade faces strikes the inner inclined sides of the teeth and is laterally deflected thereby, thus effecting a very substantial pulverizing and wide uniform distribution of the material. The shredding or cutting action of the teeth is materially facilitated by the base spacing thereof so that in the centrifugal or radial deflecting movement of the material by the rapidly revolving blade action a portion strikes the inner inclined edges of the teeth and is laterally deflected thereby while preferably a greater portion passes between the teeth in the path of revoluble movement of the cutting edges of the teeth to be struck thereby so that a thorough shredding or breaking up of the chunks is effected.

The teeth 6 are preferably of triangular form and each preferably has its forward edge, in the direction of revolution of the blade, at approximately a 45° angle, or less, to the blade circumference, to facilitate a sliding cutting action thereof on the material.

It is found in practice that when the front edge of the blade, relative to the direction of revolution, is straight and substantially radially disposed, as shown by the rear edge, stringy substances in the material acted on, such as straw, twine, or the like, will gather on the front edge of the blade, wrapping itself therearound, and cause a clogging of the distributor, which materially lessens its efficiency and requires frequent stopping to clean the blades. To avoid this, the front edge of the blade is made more in the form of a large tooth 8, providing, near the circumferential edge of the blade, a straight cutting edge 9, which is inclined outwardly relative to its axis of revolution and rearwardly relative to its direction of revolution, toward its radial center line, so that any material engaged thereby will slide outwardly along such edge and be freed therefrom by centrifugal action. This sliding freeing action also serves to cut the engaged material. It is apparent from the above and from the drawing that the blade has a circumferential edge disposed in a plane which cuts the axis of the mounting shaft at an angle, the edge being substantially concentric to the point of intersection between the plane of the blade and the axis of revolution and having its leading edge of angular form lengthwise thereof to form a tooth; that the inner line of said angle, which is adjacent to said axis, is substantially parallel to a line in the plane of the blade and radial to said point of intersection and adjacent thereto, and that the outer line of said angle extends outwardly and rearwardly relative to the direction of revolution of the blade and forms a small obtuse angle with said inner line, or an angle slightly greater than a right angle, to facilitate rearward sliding off of material striking said outer line.

The blades are made in right and left pairs, so that the blades at opposite sides of the shaft center face outwardly toward the respective shaft ends, which arrangement is common for blades of this character.

From the foregoing it will be apparent that during an operation of the spreader the front inclined faces of the rapidly revolving blades disposed at the upper side of the shaft strike the material which is delivered rearwardly of the machine by the beater means, and, as the material contacts the blades, it is deflected laterally of the distributor due to the oblique inclination of the blade to the shaft, and is also delivered radially or from the outer ends of the blades by centrifugal action. Both the material which strikes the faces of the blades and slides outwardly thereon and also that with which the teeth initially come in contact is broken and cut up by the contact of the cutting edges of the teeth therewith, and are thereby quite finely disintegrated. This is particularly true of the large solid chunks of the material which otherwise would be deflected by the blades and delivered to the ground in a more or less unbroken and solid condition. The angular disposition of the teeth with respect to the blade faces, in addition to broadening the contacting area of the blades with respect to the material, also provide a barrier in the line of centrifugal movement of the material and not only tend to break up and disintegrate the material by reason of the forceful contact therewith, but also causes lateral deflection of such material from the blades to effect a more thorough and uniform spreading.

This application is filed as a continuation in part of my application Serial No. 299,887, filed October 17, 1939.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. A distributor blade of the class described for revoluble movements about the axis of a mounting shaft, said blade being of substantially segmental form in plan with its narrow end inwardly disposed relative to its axis of revolution and having a broad flat material contacting face oblique to its plane of revolution and provided at its circumferential edge with a plurality of circumferentially spaced teeth projecting over and inclined to said face, the front edges of said teeth, relative to the direction of revolution of the blade, being rearwardly inclined, and the front edge of said blade, relative to its direction of revolution, having a single tooth formation projecting forward in the plane of the blade face, the outer edge wall of said tooth, relative to said axis, commencing at a point within and extending to the blade circumference to facilitate rearward sliding off of material striking the front edge of the blade.

2. A distributor blade of the class described for revoluble movements about the axis of a mounting shaft, said blade being of substantially segmental form in plan with its narrow end inwardly disposed relative to its axis of revolution and having a broad flat material contacting face oblique to its plane of revolution, the leading edge of said blade having a single tooth formation projecting forward in the plane of the blade face and in the direction of revolution of the blade, the outer edge wall of said tooth relative to its axis of revolution commencing at a point within and extending to the blade circumference, said edge wall forming an inner obtuse angle with an intersecting line radial to said axis of revolution.

3. A distributor blade of the class described for revoluble movements about the axis of a mounting shaft, said blade having a circumferential edge disposed in a plane which cuts the axis of the mounting shaft at an angle, the edge being substantially concentric to the point of intersection between the plane of the blade and the axis of revolution and having its leading edge of angular form lengthwise thereof to form a tooth, the inner line of said angle, which is adjacent to said axis, being substantially parallel and adjacent to a line in the plane of the blade and radial to said point of intersection, and the outer line of said angle extending outwardly and rearwardly relative to the direction of revolution of the blade and forming a small obtuse angle with said inner line to facilitate rearward sliding off of material striking said outer line.

BERNARD J. SELHORST.